Sept. 23, 1958
C. H. MINER
2,852,951
MANUALLY ADJUSTABLE VARIABLE PITCH V-TYPE PULLEY
Filed May 16, 1955
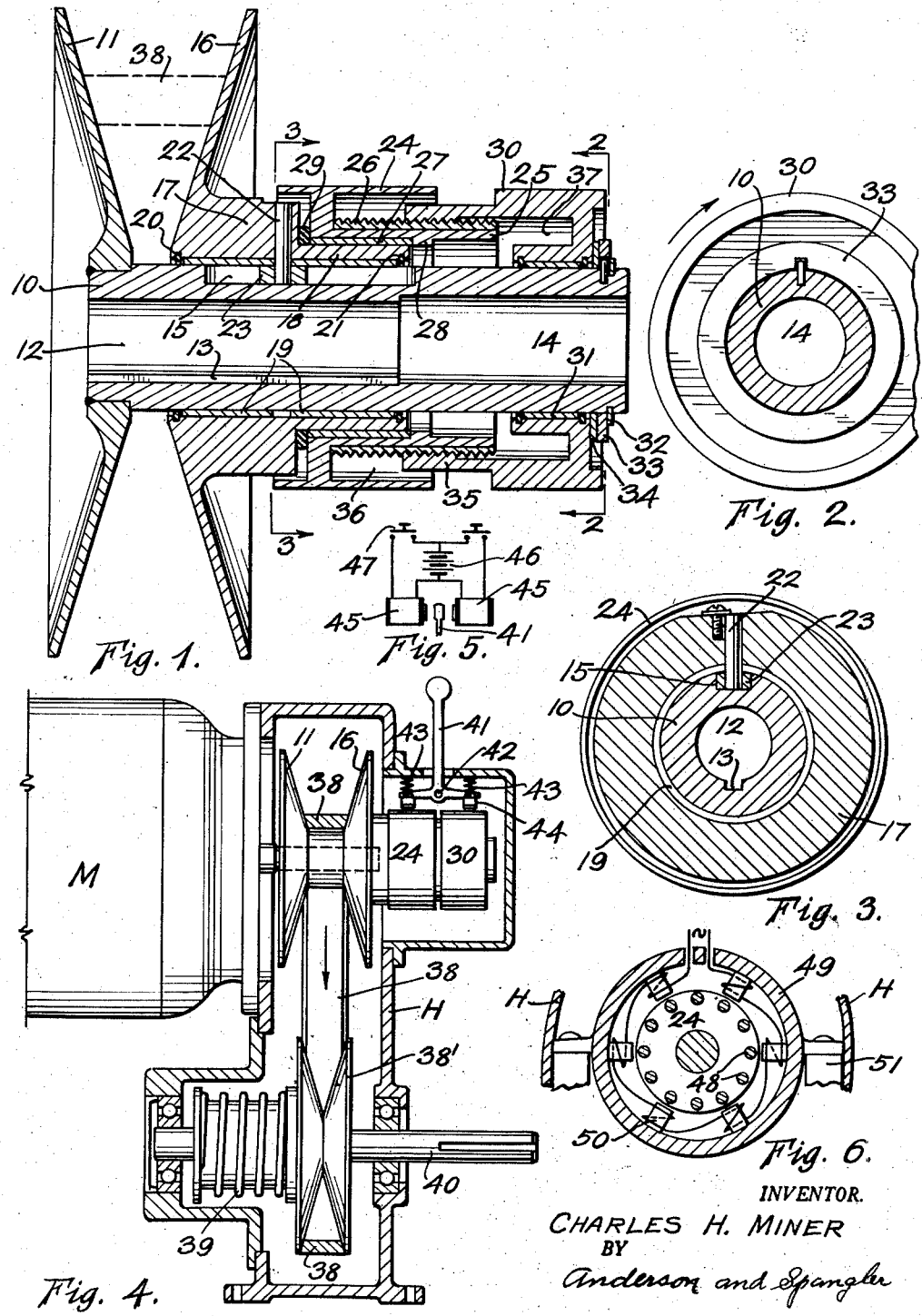
INVENTOR.
CHARLES H. MINER
BY
Anderson and Spangler
ATTORNEYS

United States Patent Office 2,852,951
Patented Sept. 23, 1958

2,852,951

MANUALLY ADJUSTABLE VARIABLE PITCH V-TYPE PULLEY

Charles Hugh Miner, Denver, Colo., assignor to The Miner Pulley and Transmission Company, Denver, Colo., a corporation of Colorado Application May 16, 1955, Serial No. 508,600

9 Claims. (Cl. 74—230.17)

This invention relates to improvements in variable pitch pulleys of the V-type and has reference more particularly to means for adjusting the pitch by manually operable means while the pulley is rotating.

In many different machines it is desirable to effect speed changes while the machine is in operation.

It is the object of this invention to provide a V-type pulley intended for constant speed rotation, with manually controlled means for adjusting the effective belt engaging diameter by a manually controlled mechanical or electro-magnetic brake mechanism that can be operated from a distance if desired.

In order to describe the invention in such a way that its construction and mode of operation can be readily understood, reference will be had to the accompanying drawing in which the invention has been illustrated, and in which:

Figure 1 is a longitudinal diametrical section through the pulley;

Figure 2 is an end view, partly in section, taken on line 2—2 Figure 1;

Figure 3 is a section taken on line 3—3 Figure 1;

Figure 4 is a view, partly in section, showing a variable speed belt drive system in which the present invention is incorporated;

Figure 5 shows in a general way, electro-magnetic means for adjusting the pulley; and, Figure 6 is a diagram illustrating an induction brake means for effecting the desired pulley adjustment.

Referring now to the drawing, reference character M designates an induction motor whose drive shaft, for the purpose of this description, rotates at the conventional speed of 1750 R. P. M. Attached to the motor drive shaft is the adjustable pulley that forms the subject of this invention and which will now be described. The construction of the pulley is most clearly shown in Figure 1, to which reference will now be had. The pulley consists of an elongated tubular, cylindrical hub 10 to one end of which is secured as by a pressed fit and welding, an outwardly flaring frusto-conical flange 11. The hub has an axial opening 12 provided with a keyway 13. Opening 12 is of the proper size to receive the motor shaft to which the pulley is attached and splined or keyed. The hub opening has a section 14 of somewhat larger diameter. The outer surface of the hub is cylindrical and has the same diameter throughout and is provided with a longitudinally extending groove 15 for a purpose that will hereinafter appear. Mounted for sliding movement on the said hub is an outer pulley element comprising an outwardly flaring frusto-conical flange 16 from one side of which the tubular hub 17 projects, which terminates in a tubular extension 18 of smaller outside diameter. The opening in hub 17 is slightly larger than the outside diameter of hub 10 and the space thus provided contains a two-part bushing, preferably of oil impregnated brass, which have been designated by numerals 19 and 20 which are held in place by snap rings 20 and 21. The two bushing sections are spaced apart sufficiently to receive the radial pin 22 whose inner end projects into a block or slide 23. It will now be apparent that hub 17 is free to move longitudinally on hub 10 but is held from relative turning movement thereon. The purpose of providing the two part bushing 19 is to prevent the two hubs from becoming locked by the formation by an oxidizing action known in the art as "fretting corrosion"; this has been fully described in applicant's co-pending application Serial Number 395,912, filed December 3, 1953, now Patent Number 2,711,103. Mounted on hub portion 17 is a brake drum 24 which has a tubular hub 25 whose outer surface carries a threaded sleeve 26 secured thereto by a pressed fit. A freely rotatable sleeve 27 of brass or bronze is held from outward movement by the action of internal rib 28. An O-ring 29 of rubber or other similar material is positioned in the space between the outer end of hub 17 and the inner end of hub 25 and serves as a friction coupling to prevent accidental relative rotation of the brake drum 24 and hub 17.

Perhaps the most important function, however, of O-ring 29 is to serve as a resilient shock absorbing member to prevent the spacing between the flanges of the pulley from changing due to the so-called "precession action" which acts in pulleys of this general type. It is well known that in pulleys having one flange mounted on the hub for relative movement in relation to the other flange, that the movable flange wobbles slightly from the action of the belt tending to spread the belt-contacting portions of the flanges apart. In addition, a rotary force component tends to rotate the movable flange relative to the fixed flange in the same direction the pulley is turning. In the present pulley, although flange 16 cannot rotate relative to fixed flange 11 but only move axially along hub 10 the same forces are present tending to rotate flange 16. Hub 25 and sleeve 26 are, however, rotatable and if these elements make direct contact with hub 17 of flange 16, or a non-compressible friction member separates them, the rotational force component will pass directly to sleeve 26 and cause it to rotate thereby changing the spacing between the flanges. O-ring 29, on the other hand, in addition to forming a friction coupling functions as a shock absorbing member due to its compressible nature and acts to absorb or damp out the rotational force component passing through hub 17 thereby maintaining the desired adjusted relation between sleeve 26 and brake drum 30. Mounted for rotation on hub 10 is a second brake drum that has been designated by reference numeral 30. An anti-fretting bronze or brass sleeve 31 is positioned between hub 10 and brake drum 30. Snap ring 32 serves as a limit stop for brake drum 30 and is spaced from the latter by a metal ring 33 and a friction producing fiber ring 34. Brake drum 30 has a cylindrical portion 35 that projects into the annular recess 36 in drum 24 and is in threaded engagement with sleeve 26. Drum 30 is also provided with an annular recess 37 for the reception of hub 25. When the pulley is in operation a V-belt 38 is positioned between flanges 11 and 16 and since such belts are always under tension it produces a force component that tends to move the parts towards the right and this subjects the O-ring 29 and the fiber ring 34 to pressure and they therefore serve as friction couplings that prevent the brake drums from accidental rotation relative to the hubs. Let us now assume that the belt exerts a yelding spreading pressure on flanges 11 and 16, that is in the nature of a helical compression spring; that sleeve 26 has a right hand thread and that the pulley rotates clockwise when viewed from its outer or right hand end. If a brake is now applied to drum 24 and stopping its rotation while drum 30 rotates with the pulley the internally threaded hub 25 will act as a nut and permit flanges 11 and 16 to separate; if on the other hand, the brake is applied to drum 30 the relative rotation between the brake drums moves flanges 11 and 16 towards each other.

In Figure 4 the pulley above described is shown as operatively attached to the drive shaft of motor M and is enclosed in a housing H. A V-pulley 38' is of the type in which the pulley flanges are urged against each other by a spring 39. In such pulleys the movable flange is longitudinally movable only and held from rotating relative to the other flange by a spline. In Figure 4 the driven shaft has been designated by numeral 40. With the belt in the position shown the transmission is adjusted at its lowest ratio. A normally neutral selective brake has been shown associated with the brake drums and consists of a T-shaped brake lever 41 pivoted at 42. Springs 43 serve to hold the brake in neutral position. Each end of the cross arm is provided with a suitable brake shoe 44. By moving lever 41 about its pivot the brake can be applied to either one of the brake drums. Let us now assume that the pulley is turning in the direction indicated by the arrow on the belt and that the brake is applied to drum 30. The flanges 11 and 16 will then move towards each other and the belt will be forced outwardly along the inclined flange surfaces. Since the belt will not stretch it will move the flanges on pulley 38' farther apart thereby decreasing the effective radius while the effective radius of the driving pulley increases. If the brake is applied to drum 24 the adjustment will be reversed. Since the driving pulley is turning 1750 R. P. M. the brakes are applied for very short intervals; the threaded connection between the drums is as fine as practicable for the purpose of slowing the rate of adjustment. It is frequently desirable to have the adjustable pulley in a place where it cannot be conveniently reached for adjustment and in such cases an electro-magnetic device can be used to control the brake. In Figure 5 a simple electro-magnetic device has been shown as an example of means for the purpose. An electro-magnet 45 is positioned on each of the opposite sides of lever 41 and connected in parallel to a source of electricity, a battery 46 has been shown. Each magnet is independently controlled by a push button type circuit closer 47.

In Figure 6 another type of electro-magnetic closure means has been illustrated. In this embodiment both brake drums are provided with a compensating short circuited winding represented by bars 48 forming in effect "squirrel cage" armatures of repulsion induction motors and are both surrounded by a field yoke 49 having three pair of inwardly projection poles 50 wound in series so as to produce alternate north and south poles. The yokes are attached by suitable means, represented by 51, to the interior of the housing. Such field magnets may be energized from the ordinary 60 cycle A. C. building supply and having three pair of poles would, as motors, produce a rotation of 1200 R. P. M. Since motor M is a four pole induction motor it is rated as rotating at 1750 R. P. M. (theoretically 1800 R. P. M.). It is well understood that such motors are considered to be constant speed motors and if the rotor is rotated by external power above its actual normal speed it will be restrained by the magnetic action. When the brake drums are made into rotating armatures and are surrounded by three pairs of poles the action of the poles will turn the drum 1200 R. P. M. which is slower than the pulley turns and the effect is therefore the same as if the drums were retarded by a mechanical brake.

Attention is directed to the fact that with the construction shown and described the pulley flanges 11 and 16 are changed by positive screw action in both directions and both changes can be made almost instantaneously and the speed can be adjusted by manually shifting the brake or when the pulley is positioned at some inconvenient or inaccessible place the adjustment can be made at a distance by electro-magnetic means.

Where the pulley must be adjusted at frequent intervals a friction brake will develop considerable heat, whereas a repulsion induction motor means will not cause any objectionable amount of heating.

What is claimed as new is:

1. A pulley comprising: an inner tubular hub having an annular convex flange depending therefrom; an outer tubular hub having an annular flange depending therefrom, said outer tubular hub being mounted on the inner tubular hub for relative movement with the flanges carried thereon arranged in opposed relation to receive a V-belt therebetween; friction coupling means carried by the inner tubular hub; a first threaded means mounted for rotation relative to the inner tubular hub in frictional engagement with the friction coupling means; a second threaded means threadedly attached to the first threaded means for relative rotational movement on the outer tubular hub, and, second friction coupling means interconnecting the second threaded means and the outer tubular hub, said second coupling means being compressible to damp out the rotational force component created in the outer tubular hub by the wobbling action of the flange depending therefrom, and the first and second threaded means cooperating to change the spacing between the flanges when one of said threaded means is stopped relative to the other rotating parts of the pulley.

2. A device in accordance with claim 1 in which a freely rotatable non-ferrous bushing is positioned between the inner and outer tubular hubs.

3. A device in accordance with claim 1 in which a freely rotatable non-ferrous bushing is positioned between the outer tubular hub and the second threaded means.

4. A device in accordance with claim 1 in which a freely rotatable non-ferrous bushing is positioned between the inner tubular hub and the first threaded means.

5. A device in accordance with claim 1 in which each of the first and second threaded means includes an external annular surface depending therefrom to form a brake drum, said drum lying in axially spaced relation and providing means for adjusting the spacing between the flanges when the speed of rotation of one or the other of said drums is changed relative to the remaining rotating parts of the pulley.

6. A device in accordance with claim 1, in which electromagnetic means are mounted for movement between an inoperative position and an operative position in selective engagement with one of the threaded means, said electromagnetic means functioning upon energization to change the speed of rotation of one of the threaded means relative to the remaining rotating parts of the pulley and thereby effect an adjustment of the spacing between the flanges.

7. A device in accordance with claim 1 in which: the pulley is operatively connected to drive means for effecting substantially constant speed rotation thereof; each threaded means is wound to form an armature of an induction brake; and, a stationary field coil is positioned around each of said armatures, said field coils being operative upon selective energization thereof to act upon the corresponding armature and change the speed of rotation thereof relative to the drive means thus effecting an adjustment in the spacing of the flanges.

8. A pulley comprising: an elongated inner tubular hub having an annular convex flange depending from one end thereof and an abutment on the other end; a first non-ferrous bushing mounted for free rotation on the inner tubular hub adjacent the flange; a second non-ferrous bushing mounted for free rotation on the inner tubular hub adjacent the abutment; an outer tubular hub having an annular convex flange depending therefrom mounted on the first bushing for axial movement relative to the inner tubular hub, the first sleeve being freely rotatable relative to the outer tubular hub, the flanges depending from the inner and outer tubular hubs being arranged in opposed relation to receive a V-belt therebetween; first brake drum means mounted on the second bushing for free rotation relative thereto and for rotation relative to both the inner and outer tubular hubs, said first drum means including a threaded section extending in the direction of the flanges; means forming a friction coupling positioned between the first brake drum means and the abutment carried by the inner tubular hub, said friction means operatively interconnecting said first brake drum means and said inner tubular hub for conjoint rotation except when an external force is applied tending to stop said brake drum; a third non-ferrous bushing mounted on the outer tubular hub for free rotation; a second brake drum means mounted on the third bushing for free rotation relative thereto and for rotation relative to both the inner and outer tubular hubs and to the first brake drum means, said second brake drum means including a threaded section mating with the threaded section of said first brake drum means; and, compressible means forming a second friction coupling positioned between the second brake drum means and the outer tubular hub, said compressible means acting to damp out the rotational force component acting through the outer tubular hub tending to rotate the second brake drum means relative to the first brake drum means, said compressible means also acting to interconnect the outer tubular hub and second brake drum means for conjoint rotation except when an external force is applied tending to stop said second brake drum, and both of said brake drum means cooperating through the threaded connection therebetween to change the spacing between the flanges when an external force is selectively applied to one or the other of said drums tending to change the rotational speed thereof in relation to other rotating parts of the pulley.

9. A device in accordance with claim 8 in which: both the first and second brake drum means are wound to form armatures of an induction brake; and, a field coil is mounted around each armature, said field coils providing means upon energization thereof for selectively changing the speed of rotation of one of said armatures relative to the remaining rotating parts of the pulley to effect an adjustment in the spacing of the flanges.

References Cited in the file of this patent

FOREIGN PATENTS 350,354    Germany _____ Mar. 18, 1922